United States Patent [19]

Kim et al.

[11] Patent Number: 4,599,857
[45] Date of Patent: Jul. 15, 1986

[54] METHOD OF POWER GENERATION AND ITS APPARATUS UTILIZING GRAVITATION FORCE AND BUOYANCY

[76] Inventors: Myung K. Kim, 9018 Dolfield Rd., Owings Mills, Md. 21117; Se E. Lee, 345-45 Kaebong-dong, Kuro-ku, Seoul, Rep. of Korea

[21] Appl. No.: 714,542

[22] Filed: Mar. 21, 1985

[30] Foreign Application Priority Data

Jan. 10, 1985 [KR] Rep. of Korea .................. 95/1985

[51] Int. Cl.$^4$ .............................................. F03G 3/00
[52] U.S. Cl. ........................................ 60/495; 60/502; 60/640; 417/337
[58] Field of Search ................ 60/497, 500, 502, 503, 60/505, 506, 507, 639, 640, 495; 417/331, 333, 337

[56] References Cited

U.S. PATENT DOCUMENTS

| | | | |
|---|---|---|---|
| 2,239,064 | 4/1941 | Tower | 60/640 |
| 4,034,565 | 7/1977 | McVeigh | 60/503 |
| 4,324,099 | 4/1982 | Palomer | 60/497 |

*Primary Examiner*—Allen M. Ostrager
*Attorney, Agent, or Firm*—Birch, Stewart Kolasch and Birch

[57] ABSTRACT

The present invention relates to an apparatus for the generation of power and its method comprising two cylinders, and pistons disposed in the cylinders, and a lever arm containing weighted balls disposed therein and connected to the pistons, whereby the balls are transferred from one end portion of the lever arm to the other end portion thereof and the lever arm, moves up and down about its axis by the force of floats or pistons and the weighted balls.

9 Claims, 6 Drawing Figures

METHOD OF POWER GENERATION AND ITS APPARATUS UTILIZING GRAVITATION FORCE AND BUOYANCY

BACKGROUND AND SUMMARY OF THE INVENTION

The present invention relates to a method of power generation and its apparatus utilizing gravitation force and buoyancy, having speciality that much bigger out-put force than in-put could be obtained by way of adding to in-put power the force generated by the action of gravity and buoyancy.

Previously, many methods and/or apparatus of gravity and buoyancy principal have been claimed that they are utilizable to generate bigger out-put than in-put, but proven only to be ideal or theoretical and not to have practical use for the claimed purpose.

However, the present invention is to provide an apparatus sufficiently and practically utilizable as a separate source of power generation.

Accordingly, it is an object of the present invention to provide a practical device for generating a power utilizing gravitation force and buoyancy.

Another object of the present invention is to provide a power generating device which is both simple in application to another machine and low in manufacturing cost.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
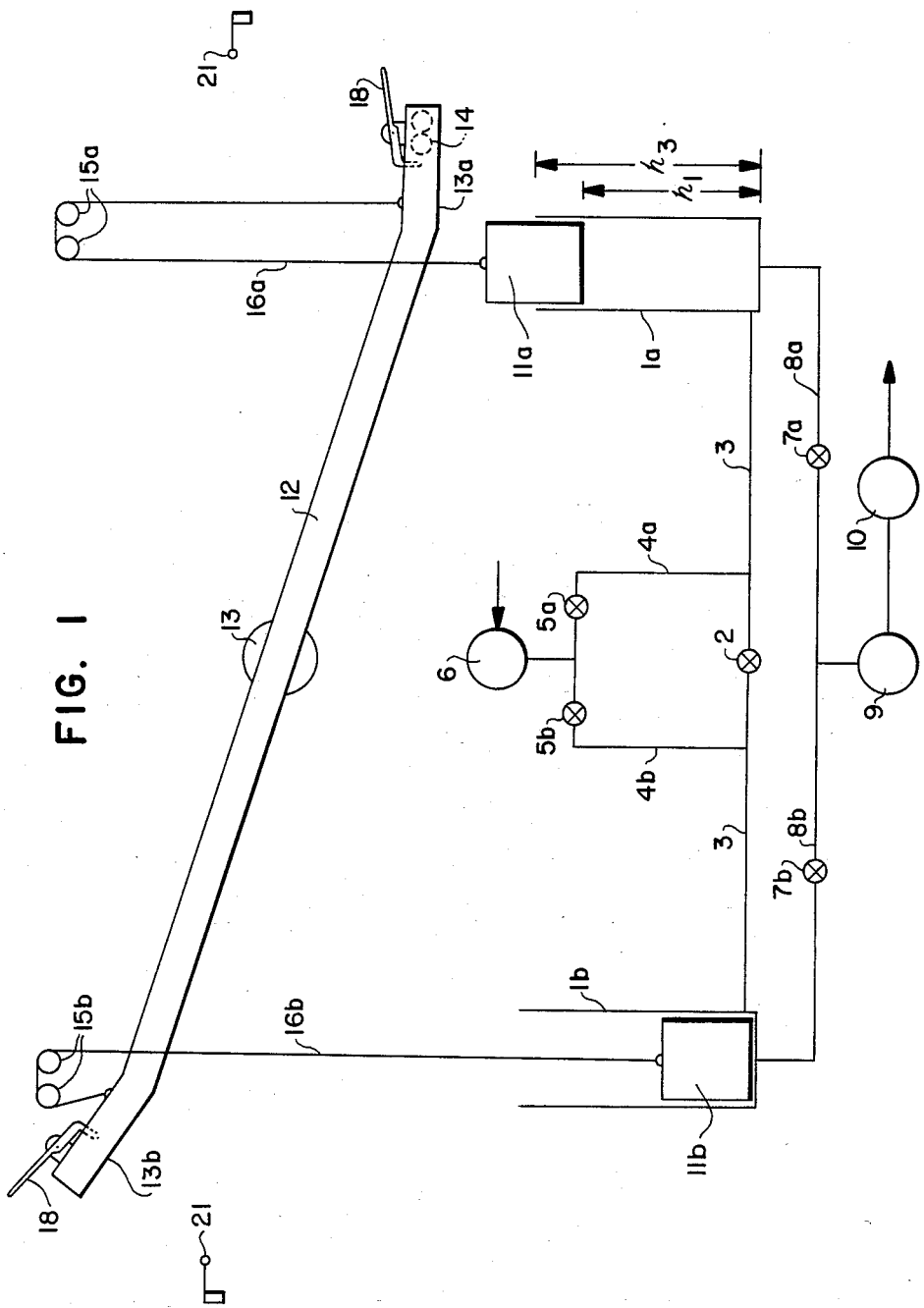
FIG. 1 diagrammatically shows the mechanical system of the present invention which one edge of obliquity of an actuating lever comes to decline.
Figure 2:
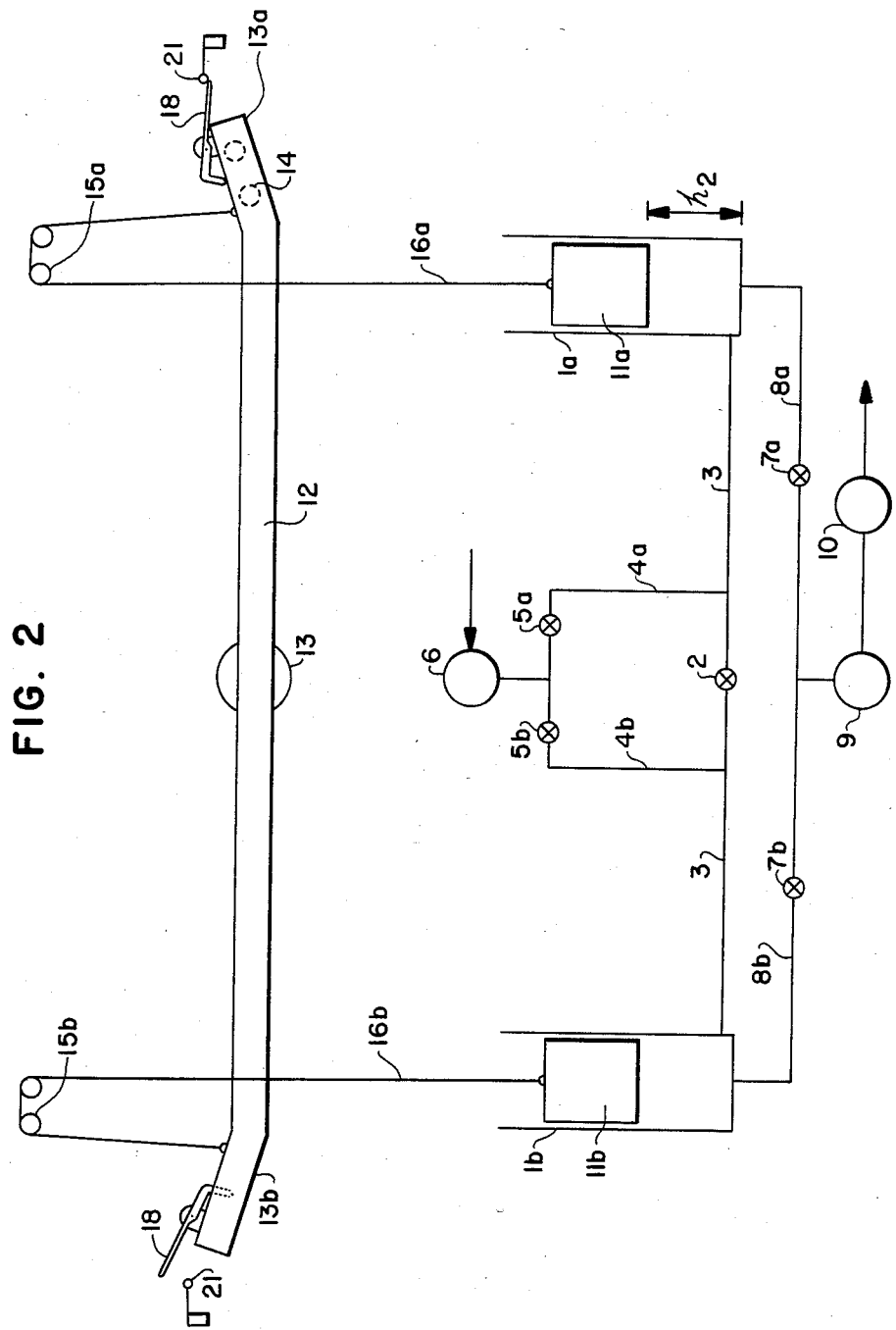
FIG. 2 diagrammatically shows the mechanical system of the present invention which the actuating lever comes to horizontal position.
Figure 3:
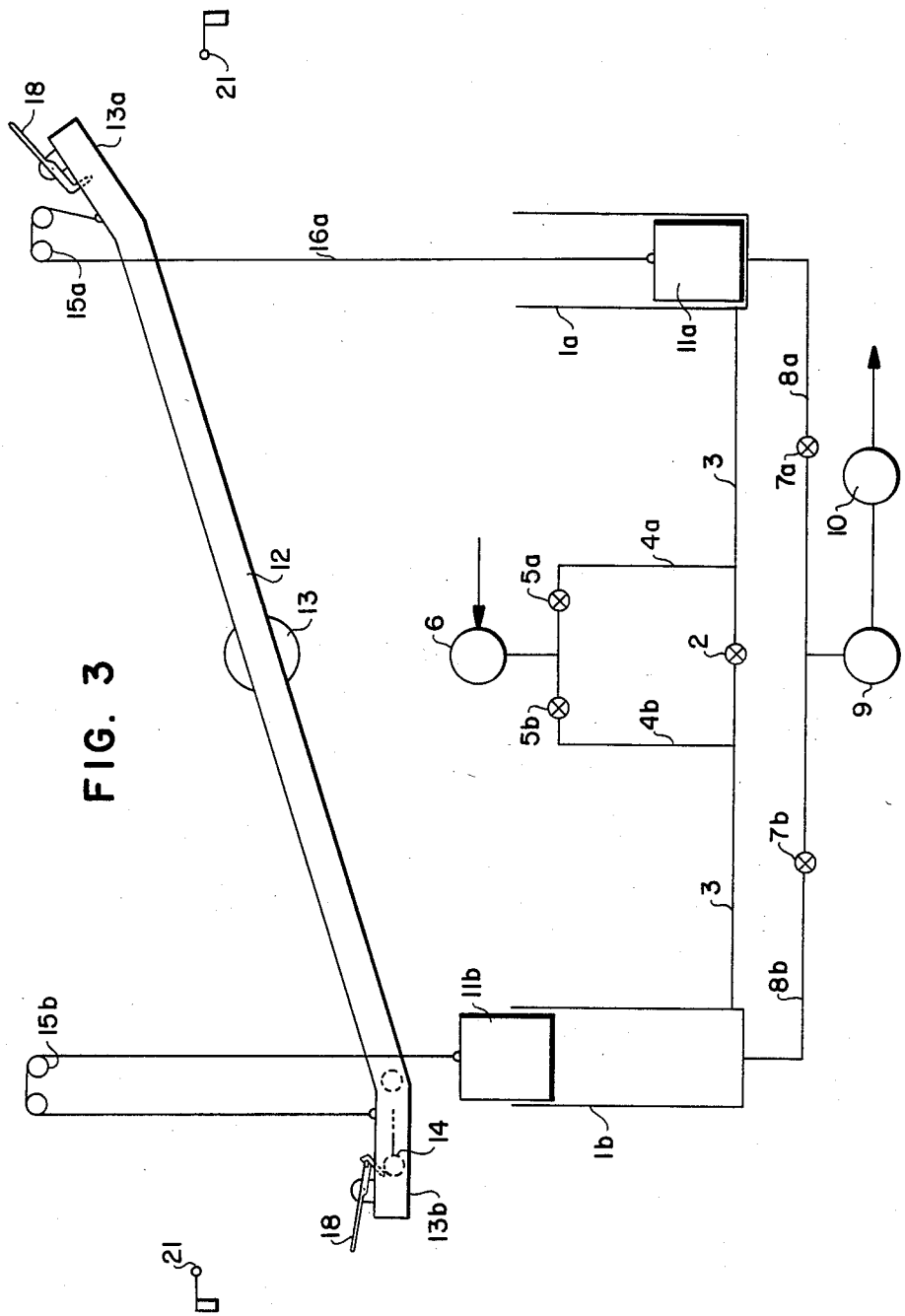
FIG. 3 diagrammatically shows the mechanical system of the present invention which the other edge of obliquity of the actuating lever comes to descended position.

Referring now in detail to the drawings for the purpose of illustrating the present invention A the power generating apparatus of the present invention as shown in FIGS. 1, 2 and 3 comprises two cylinders, 1a and 1b, of an upper end open-type. The bottom of cylinders 1a and 1b are connected to each other with a pipe 3 to which a solenoid-type valve 2 is attached. The pipe 3 is connected with water supply pipes 4a and 4b at each side of its solenoid-type valve 2 and, to the water supply pipes 4a and 4b, a water supply valve 5a and 5b is respectively attached. The other ends of the water supply pipes 4a and 4b are collaterally connected to water supply tank 6.

Again, the bottom of cylinders 1a and 1b is respectively linked with water drainage pipe 8a and 8b and, the other ends of drainage pipes 8a and 8b are collaterally connected to water drainage tank 9 and to the water drainage pipes 8a and 8b, a drainage valve 7a and 7b is respectively attached.

The water drainage tank 9 is equipped with a water pump 10 and the pump is extended to the water supply tank 6 with a hose or pipe.

And, to the upper end open-type cylinders 1a and 1b, floats 11a and 11b having one half volume of the cylinder is inserted respectively as piston, leaving a certain extent of clearance between the floa and cylinder to have the float moved up and down smoothly without any interference. The clearance between the floats and cylinder is kept 3/1000-10/1000 of the inside diameter of the cylinder.

As to the operation of the solenoid-type valve 2, water supply valve 5a and 5b and water drainage valve 7a and 7b, the solenoid-type valve 2 is to be operated independently for closing and/or opening water flow from one cylinder to the other and vice versa while, valve 5a on the water supply pipe 4a and valve 7a on the water drainage pipe 8b, valve 5b on the water supply pipe 4b and valve 7b on the water drainage pipe 8a are to be opened and closed simultaneously.

The floats 11a and 11b are individually connected to the seesaw-type actuating lever 12. This actuating lever is of a tube-type, the center axis of which is set at the symmetrical axis of the two cylinders 1a and 1b, thus concentrate the force to the out-put axis 13 as shown on the illustration and, the out-put force resulted from the action of the actuating lever 12 and concentrated to the out-put axis 13 can be induced to other known apparatus through converting system of rotation to rectilinear motion or rectilinear motion to rotation.

The tube-type actuating lever 12 has, at each end, upward oblique edges 13a and 13b of 20 degree in comparison with the axis of abscissa and, inside the oblique edge, weighty balls 14 of increasing out-put, movable from one edge to the other and backward, are placed.

The floats 11a and 11b are respectively connected to the axis of the upward oblique edges 13a and 13b with wires 16a and 16b through guide-rollers 15a and 15b installed above the actuating lever 12.

Figure 5:
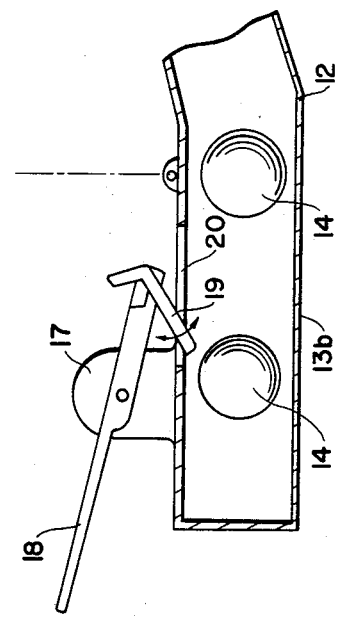
FIG. 5 is a sectional view of the other edge of obliquity of the actuating lever according to the present invention showing the movement of the out-put increasing balls.
Figure 4A:
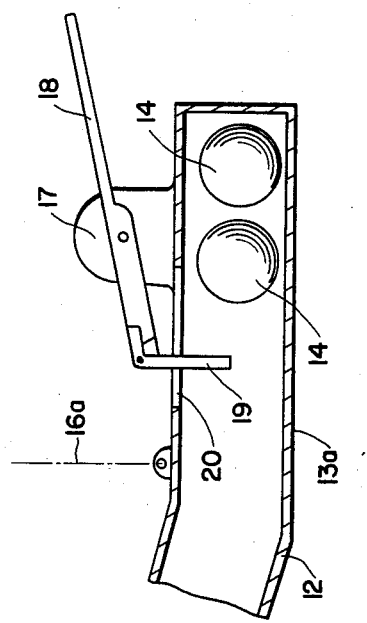
FIGS. 4A and 4B are sectional views of the edge of obliquity of the seesaw-type actuating lever according to the present invention showing how the output increasing balls move as the gate releases.
Figure 4B:
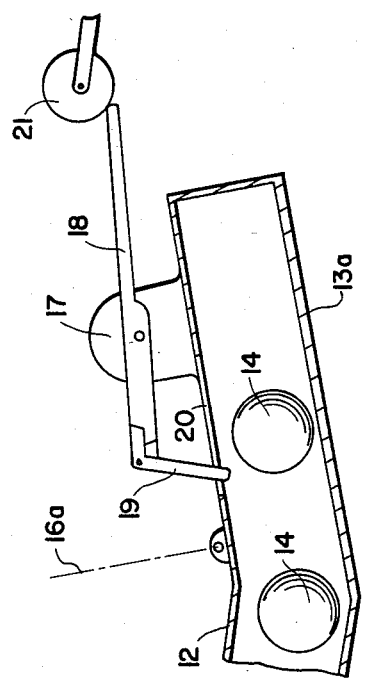

On top of the oblique edge 13a and 13b of the actuating lever 12, installed a bracket 17 and attached thereto a gate lever 18 as shown in FIGS. 4A and 4B and FIG. 5. The gate lever is extended to outside through the oblique edges 13a and 13b and, to the other end of gate lever, a gate 19 openable only to one side toward the end of oblique edge is installed. The under side of gate is inserted into the oblique edge through a slot made on the edge of obliquity to control the movement of the out-put increasing balls 14.

The gate lever 18 is put into action by a roller-type stopper fixed to the moving trail of the oblique edges 13a and 13b, as the actuating lever 12 balances itself to the horizontal position along the fluctuation of floats 11a and 11b.

In operation, as shown in FIG. 1, the water supply valve 5a is opened to supply water to the cylinder 1a to the water height of $h_1$ and, simultaneously, open drainage valve 7b to drain the other cylinder 1b completely. The float 11a within cylinder 1a is, then, inclined due to buoyant force to the highest point while the other float 11b is declined to the lowest position by gravitation force. Accordingly, as the float 11a inclines, the oblique edge 13a of actuating lever 12 comes to descended position and, as the actuating lever 12 descended, the out-put increasing balls 14 moved the end of the oblique edge and the gate 19 is set in the position inserted into the oblique edge.

As soon as the apparatus positioned as shown in FIG. 1, close the water supply valve 5a and drainage valve 7b and, at the same time, open the solenoid-type valve 2, on pipe 3. The water filled in cylinder 1a is then flown naturally to the other cylinder 1b through pipe 3 and, thereby, the two floats 11a and 11b position respectively to the same height of $h_2$. The height $h_2$ is equivalent to one half of the height hl. As the water moves, the actuating lever 12 is moved counter clock-wise to horizontal position and the out-put increasing balls 14 confined within the oblique edge 13a are forced to move toward the central axis of actuating lever by gravity but stopped by the gate.

In succession of opening the solenoid-type valve 2 as above, open drainage valve 7a and water supply valve 5b jointly. The actuating lever 12 is then, moved to the opposite position as shown from FIG. 1 position to FIG. 3. As the actuating lever moves up, the gate lever 18 installed to the oblique edge 13a is held by the stopper 21 and, thereby lifting the gate 19 to release the out-put increasing balls 14. The balls as released move forward to the other edge of obliquity with positive acceleration and enter into the oblique edge 13b, pushing the gate, as shown in FIG. 3.

By consequently repeating this series of action back and forth, increased out-put force can be obtained from the actuating lever 12.

The most important point of the subject invention is believed to be the clearance between the float and cylinder and, taking into consideration the water lever h3 in which the float 11a and 11b is immersed, several experiments have been made to prove that additional buoyant force corresponding to the actual volume of float 11a or 11b, which is equivalent to water lever h3 minus h1 can be obtained.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for the generation of power which comprises:
    a first cylinder and a second cylinder,
    a first float and a second float member disposed in said first and second cylinders, respectively,
    a lever arm pivotally disposed above the cylinder, the end portions of said lever arm being operatively connected to said respective float members, said lever arm containing weight members and defining a path for guiding said weight members to traverse said lever arm between said end portions, and
    means for alternatively introducing and removing a fluid to and from said first and second cylinders, whereby when the fluid is introduced into said first cylinders and simulatenously removed from the second cylinders, the first float member is caused to rise wherein the first cylinder and the second float member is caused to fall in the second cylinder, causing the lever arm to pivot about its axis which in turn causes to weight members to relocate from one end portion of the lever arm to the other end portion thereof.

2. The apparatus of claim 1, wherein both end portions of the lever arm extend at an oblique angle relative to the lever arm.

3. The apparatus of claim 2, wherein the oblique end portions contain gate means for containing the weight member within said end portions during intermediate positions of the lever arm but releases said weight member when the lever arm is disposed in positions beyond said intermediate positions.

4. The apparatus of claim 1, wherein the bottom of the first and second cylinder are connected to a main water tank.

5. The apparatus of claim 1 wherein the cylinder has twice the volume of the float.

6. The apparatus of claim 1, wherein the clearance between the float and cylinder is from 3/1000 to 10/1000 of the inside diameter of the cylinder.

7. The apparatus of claim 1 wherein means are provided for introducing water into the main tank and remaining water from the respective cylinders.

8. The apparatus for the generation of power of claim 1 wherein the lever arm is a tube member and the weight members are weighted balls disposed in said tube member.

9. A method for the generation of power utilizing first and second cylinders containing float members disposed therein, a pivotally disposed lever arm connected to said float members said lever arm containing a weight member which is free to move therein and means for introducing a fluid into said cylinders and removing said fluid from said cylinders which method comprises:
    introducing a fluid into said first cylinders and simultaneously removing a like amount of fluid from said second cylinder, whereby said fluid distribution causes the float member to rise in said first cylinder and fall in said second cylinder which in turn causes the lever arm to pivot about its axis which transfers the weight member from one end portion of the lever arm to the other end portion thereof.

* * * * *